United States Patent
Kawabe et al.

(10) Patent No.: US 10,266,906 B2
(45) Date of Patent: Apr. 23, 2019

(54) HIGH-STRENGTH GALVANIZED STEEL SHEET AND METHOD FOR MANUFACTURING THE SAME

(71) Applicant: JFE STEEL CORPORATION, Tokyo (JP)

(72) Inventors: Hidetaka Kawabe, Tokyo (JP); Takeshi Yokota, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 518 days.

(21) Appl. No.: 14/779,772

(22) PCT Filed: Mar. 26, 2014

(86) PCT No.: PCT/JP2014/001728
§ 371 (c)(1),
(2) Date: Sep. 24, 2015

(87) PCT Pub. No.: WO2014/156140
PCT Pub. Date: Oct. 2, 2014

(65) Prior Publication Data
US 2016/0047011 A1  Feb. 18, 2016

(30) Foreign Application Priority Data
Mar. 28, 2013 (JP) ................................. 2013-068296

(51) Int. Cl.
| | | |
|---|---|---|
| *C21D 8/02* | (2006.01) | |
| *C23C 2/06* | (2006.01) | |
| *C23C 2/40* | (2006.01) | |
| *C21D 9/46* | (2006.01) | |
| *C22C 38/00* | (2006.01) | |
| *C22C 38/06* | (2006.01) | |
| *B32B 15/01* | (2006.01) | |
| *C22C 38/02* | (2006.01) | |
| *C22C 38/04* | (2006.01) | |
| *C23C 2/02* | (2006.01) | |
| *C23C 2/28* | (2006.01) | |
| *C21D 6/00* | (2006.01) | |
| *C23F 17/00* | (2006.01) | |

(52) U.S. Cl.
CPC .......... *C21D 8/0247* (2013.01); *B32B 15/013* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0273* (2013.01); *C21D 8/0278* (2013.01); *C21D 9/46* (2013.01); *C22C 38/00* (2013.01); *C22C 38/001* (2013.01); *C22C 38/002* (2013.01); *C22C 38/02* (2013.01); *C22C 38/04* (2013.01); *C22C 38/06* (2013.01); *C23C 2/02* (2013.01); *C23C 2/06* (2013.01); *C23C 2/28* (2013.01); *C23C 2/40* (2013.01); *C23F 17/00* (2013.01); *C21D 2211/002* (2013.01); *C21D 2211/005* (2013.01); *C21D 2211/008* (2013.01)

(58) Field of Classification Search
CPC ......... C22C 38/04; C22C 38/06; C22C 38/00; C21D 8/0247; C21D 9/46; C21D 8/0226; C21D 8/0236; C21D 8/0273; C21D 6/005; C21D 6/008; C21D 8/0205
See application file for complete search history.

(56) References Cited

U.S. PATENT DOCUMENTS

| | | |
|---|---|---|
| 9,040,169 B2 | 5/2015 | Hamada |
| 2004/0074575 A1 | 4/2004 | Kashima |
| 2011/0139315 A1 | 6/2011 | Nakagaito |
| 2011/0186189 A1 | 8/2011 | Futamura |
| 2012/0222781 A1 | 9/2012 | Azuma |
| 2013/0167980 A1* | 7/2013 | Kawata ................ C21D 8/0226 148/504 |

FOREIGN PATENT DOCUMENTS

| | | |
|---|---|---|
| CA | 2811189 | 3/2012 |
| CN | 102348821 A | 2/2012 |

(Continued)

OTHER PUBLICATIONS

Chinese Office Action with partial English language translation for Application No. 201480018749.7, dated Jan. 11, 2017, 5 pages.
International Search Report for International Application No. PCT/JP2014/001728 dated May 13, 2014.
Korean Office Action with partial English language translation for Application No. 2015-7026901, dated Sep. 23, 2016, 14 pages.

(Continued)

*Primary Examiner* — Jessee R Roe
(74) *Attorney, Agent, or Firm* — RatnerPrestia

(57) ABSTRACT

A high-strength galvanized steel sheet has a chemical composition containing, by mass %, C: 0.16% or more and 0.24% or less, Si: 0.8% or more and 1.8% or less, Mn: 1.0% or more and 3.0% or less, P: 0.020% or less, S: 0.0040% or less, Al: 0.01% or more and 0.1% or less, N: 0.01% or less, Ca: 0.0001% or more and 0.0020% or less, and the balance including Fe and incidental impurities, and a microstructure, in which the total area ratio of a ferrite phase and a bainite phase with respect to the whole microstructure is 30% or more and 70% or less, in which the area ratio of a tempered martensite phase with respect to the whole microstructure is 20% or more and 40% or less, in which the area ratio of a retained austenite phase with respect to the whole microstructure is 10% or more and 20% or less, and in which the area ratio of a martensite phase with respect to the whole microstructure is 2% or more and 20% or less.

3 Claims, No Drawings

(56) References Cited

FOREIGN PATENT DOCUMENTS

| | | |
|---|---|---|
| EP | 1486574 | 12/2004 |
| EP | 2407568 | 1/2012 |
| EP | 2444510 | 4/2012 |
| JP | 2003171735 | 6/2003 |
| JP | 2008291304 | 12/2008 |
| JP | 2009203548 | 9/2009 |
| JP | 2010043360 | 2/2010 |
| JP | 2011157583 | 8/2011 |
| JP | 2011168816 | 9/2011 |
| JP | 2011214101 | 10/2011 |
| JP | 2012122093 | 6/2012 |
| JP | 2012214868 | 11/2012 |
| JP | 2012237042 | 12/2012 |
| KR | 20040091751 | 10/2004 |
| WO | 2011065591 | 6/2011 |
| WO | 2012036269 | 3/2012 |

OTHER PUBLICATIONS

Chinese Office Action and Search Report with partial English translation for Application No. 201480018749.7 dated May 18, 2016, 7 pages.
Extended European Search Report dated Feb. 1, 2016 for European Application no. 14773760.5-1373.

* cited by examiner

HIGH-STRENGTH GALVANIZED STEEL SHEET AND METHOD FOR MANUFACTURING THE SAME

CROSS REFERENCE TO RELATED APPLICATIONS

This is the U.S. National Phase application of PCT/JP2014/001728, filed Mar. 26, 2014, which claims priority to Japanese Patent Application No. 2013-068296, filed Mar. 28, 2013, the disclosures of each of these applications being incorporated herein by reference in their entireties for all purposes.

FIELD OF THE INVENTION

The present invention relates to a high-strength steel sheet suitably used for, for example, automobile parts and a method for manufacturing the steel sheet, that is, to a high-strength galvanized steel sheet having a tensile strength (TS) of 900 MPa or more and preferably without actively adding expensive chemical elements such as Ti, Nb, V, Cu, Ni, Cr, and Mo, and having excellent elongation and stretch flange formability and a method for manufacturing the steel sheet.

BACKGROUND OF THE INVENTION

Since many automobile parts have complex shapes, materials for the parts are required to be excellent in terms of formability indexes such as elongation (El) and stretch flange formability (also referred to as hole-expanding property). In addition, in the case where strength is increased to a TS of 900 MPa class or more, there is a case where very expensive rare chemical elements such as Ti, Nb, V, Cu, Ni, Cr, and Mo are actively added from the viewpoint of achieving high strength.

Here, some techniques have been proposed regarding a galvanized steel sheet excellent in terms of both elongation and stretch flange formability. For example, Patent Literature 1 discloses a high-strength and high-yield-ratio galvanized steel sheet having a tensile strength of 980 MPa or more and excellent formability, the steel sheet having a chemical composition containing, by mass %, C: 0.12% to 0.3%, Si: 0.1% or less (exclusive of 0%), Mn: 2.0% to 3.5%, P: 0.05% or less (exclusive of 0%), S: 0.05% or less (exclusive of 0%), Al: 0.005% to 0.1%, N: 0.015% or less (exclusive of 0%), and the balance being Fe and incidental impurities, and having a metallographic structure including bainite as a primary phase, in which the area ratio of ferrite is 3% to 20% and the area ratio of martensite is 10% to 35% with respect to the whole of the microstructure. Patent Literature 2 discloses a high-strength galvanized steel sheet excellent in terms of hole-expanding property and ductility, the steel sheet having a chemical composition containing, by mass %, C: 0.03% to 0.20%, Si: 1.0% or less, Mn: 0.01% to 3%, P: 0.0010% to 0.1%, S: 0.0010% to 0.05%, Al: 0.3% to 2.0%, Mo: 0.01% to 5.0%, one, two, or more of Ti: 0.001% to 0.5%, Nb: 0.001% to 0.5%, B: 0.0001% to 0.0050%, and Cr: 0.01% to 5%, and the balance being Fe and incidental impurities, having a microstructure including, in terms of area ratio, 30% or more of ferrite, and having a tensile strength of 850 MPa or more. Moreover, Patent Literature 3 discloses a galvannealed steel sheet excellent in terms of ductility and corrosion resistance, the steel sheet having a chemical composition containing, by mass %, C: 0.10% to 0.50%, Mn: 1.0% to 3.0%, Si: 0.005% to 2.5%, and Al: 0.005% to 2.5%, in which P content is limited to be 0.05% or less, S content is limited to be 0.02% or less, N content is limited to be 0.006% or less, and the total content of Si and Al satisfies the relationship Si+Al≥0.8%, and having a microstructure including, in terms of area ratio, 10% to 75% of ferrite and 2% to 30% of retained austenite, in which C content in the retained austenite is 0.8% to 1.0%.

PATENT LITERATURE

PTL 1: Japanese Unexamined Patent Application Publication No. 2011-214101

PTL 2: Japanese Unexamined Patent Application Publication No. 2010-43360

PTL 3: Japanese Unexamined Patent Application Publication No. 2011-168816

SUMMARY OF THE INVENTION

Since the steel sheet disclosed in Patent Literature 1 has a microstructure including a ferrite phase and a martensite phase, and including a bainite phase as a primary phase, the steel sheet is not regarded as having sufficient elongation. Although the steel sheet disclosed in Patent Literature 2 contains Mo, which is an expensive chemical element, and has a microstructure including, in terms of area ratio, 30% or more of ferrite, the steel sheet is not regarded as having sufficient elongation.

In contrast, in the case of the steel sheet disclosed in Patent Literature 3, high elongation is achieved by focusing on the transformation induced plasticity of retained austenite and by controlling the area ratio of a retained austenite phase and C content in retained austenite. However, in reference to Examples in the literature, since it is disclosed only that a steel sheet having a TS of 778.2 to 1043.7 MPa can be obtained in the case where C content is 0.25% to 0.28%, it is not clear whether or not a steel sheet having a TS of 900 MPa or more can be stably obtained by using the technique according to Patent Literature 3 in the case where the C content is less than 0.25%. Here, there is concern that it may not be possible to obtain a welded joint having sufficient strength when spot welding is performed in the case of a steel sheet having a C content of 0.25% or more.

An aim of aspects of the present invention is, by solving the problems described above in a chemical composition to which expensive alloy elements such as Ti, Nb, V, Cu, Ni, Cr, and Mo are not actively added, to provide a high-strength galvanized steel sheet having excellent formability including elongation and stretch flange formability and a tensile strength (TS) of 900 MPa or more and a method for manufacturing the steel sheet.

The present inventors diligently conducted investigations in order to solve the problems described above and, as a result, found that it is possible to obtain—as a non-limiting example, see items a) and b) below—a galvanized steel sheet particularly excellent in terms of elongation and stretch flange formability and preferably having a tensile strength of 900 MPa or more, even with the expensive scarce metals described above being added only in small amounts.

a) C content is controlled to be 0.24% or less from the viewpoint of weldability and formability, and b) The metallographic structure is composed of a ferrite phase, a bainite phase, a tempered martensite phase, a retained austenite phase, and a martensite phase with the area ratios of these phases being controlled to be within specified ranges.

The present invention has been completed, in part, on the basis of such knowledge, and the subject matter of aspects of the present invention is as follows.

(1) Provided is a high-strength galvanized steel sheet having a chemical composition containing, by mass %, C: 0.16% or more and 0.24% or less, Si: 0.8% or more and 1.8% or less, Mn: 1.0% or more and 3.0% or less, P: 0.020% or less, S: 0.0040% or less, Al: 0.01% or more and 0.1% or less, N: 0.01% or less, Ca: 0.0001% or more and 0.0020% or less, and the balance comprising Fe and incidental impurities, and a microstructure, in which the total area ratio of a ferrite phase and a bainite phase with respect to the whole microstructure is 30% or more and 70% or less, in which the area ratio of a tempered martensite phase with respect to the whole microstructure is 20% or more and 40% or less, in which the area ratio of a retained austenite phase with respect to the whole microstructure is 10% or more and 20% or less, and in which the area ratio of a martensite phase with respect to the whole microstructure is 2% or more and 20% or less.

(2) The high-strength galvanized steel sheet according to aspects of the present invention can be manufactured using, for example, a method including hot-rolling a steel slab having the chemical composition described above, performing pickling on the hot-rolled steel sheet, thereafter performing cold rolling, thereafter performing a heat treatment including heating the cold-rolled steel sheet to a temperature of 800° C. or higher and 950° C. or lower, and then cooling the heated steel sheet, thereafter performing another heat treatment including heating the treated steel sheet to a temperature of 700° C. or higher and 850° C. or lower, cooling the heated steel sheet to a temperature of 100° C. or higher and 300° C. or lower at a cooling rate of 5° C./sec or more and 50° C./sec or less, stopping the cooling, subsequently heating the cooled steel sheet to a temperature of 350° C. or higher and 600° C. or lower, and holding the steel sheet for 10 seconds or more and 500 seconds or less, and thereafter performing a galvanizing treatment.

(3) It is preferable that methods according to embodiments of the present invention further include performing a heat treatment on the pickled steel sheet in such a manner that the pickled steel sheet is heated to a temperature of 400° C. or higher and 750° C. or lower before the cold rolling is performed.

According to aspects of the present invention, it is possible to obtain a high-strength galvanized steel sheet excellent in terms of elongation and stretch flange formability and having a tensile strength of 900 MPa or more without actively adding the expensive chemical elements described above. In addition, the high-strength galvanized steel sheet obtained using the present invention can suitably be used for automobile parts which are formed into shapes with strict requirements by performing press forming.

DETAILED DESCRIPTION OF EMBODIMENTS OF THE INVENTION

The present inventors diligently conducted investigations for increasing the elongation of a high-strength galvanized steel sheet and, as a result, found that there is a significant increase in elongation by having a specified microstructure, even with a chemical composition which does not contain expensive chemical elements such as Ti, Nb, V, Cu, Ni, Cr, and Mo. That is, in aspects of the present invention, the microstructure is formed in such a manner that the total area ratio of a ferrite phase and a bainite phase with respect to the whole microstructure is 30% or more and 70% or less, that the area ratio of a tempered martensite phase with respect to the whole microstructure is 20% or more and 40% or less, that the area ratio of a retained austenite phase with respect to the whole microstructure is 10% or more and 20% or less, and that the area ratio of a martensite phase with respect to the whole microstructure is 2% or more and 20% or less. Embodiments of the present invention will be described in detail hereafter.

First, the chemical composition according to one embodiment of the present invention will be described. Here, the contents of the constituent chemical elements are all expressed in units of mass %, and "mass %" will be expressed simply as "%" hereinafter, unless otherwise noted.

C: 0.16% or more and 0.24% or less

C is an austenite-stabilizing chemical element, and is a chemical element which contributes to an increase in uniform elongation by influencing the formation of a retained austenite phase and to an increase in strength by influencing the area ratios and hardnesses of a tempered martensite phase and a martensite phase. In the case where the C content is less than 0.16%, since a ferrite phase is formed in an excessive amount, it is difficult to achieve satisfactory tensile strength, and it is difficult to obtain a desired amount of retained austenite, which makes excellent elongation difficult to be achieved. Therefore, the C content is set to be 0.16% or more, or preferably 0.18% or more. On the other hand, in the case where the C content is more than 0.24%, there is a significant decrease in weldability, and it is difficult to achieve excellent elongation due to an excessive increase in tensile strength as a result of a martensite phase becoming excessively hard. Therefore, the C content is set to be 0.24% or less, preferably 0.23% or less, or more preferably 0.22% or less. Therefore, the C content is set to be 0.16% or more and 0.24% or less. From the viewpoint of weldability, it is preferable that the C content be 0.18% or more and 0.23% or less, or more preferably 0.18% or more and 0.22% or less.

Si: 0.8% or more and 1.8% or less

Si is a chemical element which is effective for increasing the strength of steel through solid solution strengthening and which improves the balance of strength and elongation (TS-El balance) by contributing to an increase in uniform elongation as a result of influencing the formation of a retained austenite phase. In the case where the Si content is less than 0.8%, such effects are not realized. Therefore, the Si content is set to be 0.8% or more, or preferably 1.2% or more. On the other hand, in the case where the Si content is more than 1.8%, since there is an increase in the amount of Si concentrated on the surface, bare spots of zinc layer occur. Therefore, the Si content is set to be 1.8% or less, or preferably 1.6% or less. Accordingly, the Si content is set to be 0.8% or more and 1.8% or less, preferably 1.2% or more and 1.8% or less, or more preferably 1.2% or more and 1.6% or less.

Mn: 1.0% or more and 3.0% or less

Mn is an austenite-stabilizing chemical element, and is a chemical element which contributes to controlling strength by causing desired amounts of a tempered martensite phase and a martensite phase to be formed finally. In order to realize such an effect, it is desirable that the Mn content be 1.0% or more, preferably 1.5% or more, or more preferably 1.7% or more. On the other hand, in the case where the Mn content is more than 3.0%, since it is difficult to form desired amounts of a ferrite phase or a bainite phase due to an excessive increase in hardenability, there is an increase in the area ratios of a tempered martensite phase and a martensite phase, which makes excellent elongation difficult to be achieved due to an excessive increase in hardness. Therefore, the Mn content is set to be 3.0% or less, preferably 2.5% or less, or more preferably 2.3% or less. Accordingly, the Mn content is set to be 1.0% or more and 3.0% or less, preferably 1.5% or more and 2.5% or less, or more preferably 1.7% or more and 2.3% or less.

P: 0.020% or less

Since P is a chemical element which has a negative effect on weldability, it is preferable that the P content be as small as possible. Although there is a significant decrease in weldability, in particular, in the case where the P content is more than 0.020%, it is acceptable that the P content be 0.020% or less. Therefore, the P content is set to be 0.020% or less, or preferably less than 0.010%. On the other hand, since there is an increase in cost due to a decrease in production efficiency in a steel making process in the case where the P content is excessively decreased, it is preferable that the P content be 0.001% or more. Accordingly, it is preferable that the P content be 0.001% or more and 0.020% or less. In consideration of weldability, it is more preferable that the P content be 0.001% or more and less than 0.010%.

S: 0.0040% or less

Since S becomes the origin of an inclusion-induced crack as a result of existing as inclusions in steel, it is preferable that the S content be as small as possible. Although there is a significant decrease in stretch flange formability, in particular, in the case where the S content is more than 0.0040%, it is acceptable that the S content be 0.0040% or less. Therefore, the S content is set to be 0.0040% or less, or preferably 0.0020% or less. On the other hand, since it is industrially difficult to decrease the S content beyond certain limits, and since there is an increase in desulfurization costs in a steel making process and there is a decrease in productivity in the case where the S content is excessively decreased, it is preferable that the S content be 0.0001% or more. Accordingly, it is preferable that the S content be 0.0001% or more and 0.0040% or less, or more preferably 0.0001% or more and 0.0020% or less.

Al: 0.01% or more and 0.1% or less

Al is added as a deoxidizing agent for steel, and it is desirable that the Al content be 0.01% or more, or preferably 0.02% or more. On the other hand, in the case where the Al content is more than 0.1%, since there is an increase in the amount of inclusions such as alumina in the surface layer of a steel sheet, there is a decrease in elongation and bendability. Therefore, the Al content is set to be 0.1% or less, preferably 0.08% or less, or more preferably 0.06% or less. Accordingly, the Al content is set to be 0.01% or more and 0.1% or less, preferably 0.02% or more and 0.08% or less, or more preferably 0.02% or more and 0.06% or less.

N: 0.01% or less

Since N is a chemical element which influences aging characteristics, it is preferable that the N content be as small as possible. Since strain aging becomes noticeable, in particular, in the case where the N content is more than 0.01%, the N content is set to be 0.01% or less, or preferably 0.0060% or less. On the other hand, since there is an increase in denitrification costs in a steel making process and there is a decrease in productivity in the case where the N content is excessively decreased, it is preferable that the N content be 0.0001% or more. Therefore, it is preferable that the N content be 0.0001% or more and 0.01% or less, or more preferably 0.0001% or more and 0.0060% or less.

Ca: 0.0001% or more and 0.0020% or less

Ca is effective for preventing a decrease in local deformation capability by spheroidizing a plate-shaped sulfide inclusion which becomes the origin of a crack when deformation is applied. In order to realize such an effect, it is desirable that the Ca content be 0.0001% or more. On the other hand, in the case where the Ca content is more than 0.0020%, since there is an excessive increase in the amount of Ca-based inclusions which become origins of inclusion-induced cracks, there is a decrease in elongation and bendability. Therefore, the Ca content is set to be 0.0020% or less, or preferably 0.0010% or less. Accordingly, the Ca content is set to be 0.0001% or more and 0.0020% or less, or preferably 0.0001% or more and 0.0010% or less.

Here, in the steel sheet according to aspects of the present invention, the constituent chemical elements other than those described above are Fe and incidental impurities. However, chemical elements other than those described above are not excluded as long as the effects of the present invention are not decreased.

From the viewpoint of not actively including expensive alloy chemical elements that is one purpose of the present invention, it is preferable that Ti, Nb, V, Cu, Ni, Cr, and Mo not be added.

Hereafter, limited ranges and the reasons for the limitations of the microstructure of steel, which is one of the beneficial conditions of embodiments of the present invention, will be described in detail.

Total area ratio of a ferrite phase and a bainite phase with respect to the whole microstructure: 30% or more and 70% or less A bainite phase, which is composed of cementite and a ferrite phase, and a ferrite phase are softer than a martensite phase, and contribute to an increase in elongation. It is desirable that the total area ratio of the ferrite phase and the bainite phase with respect to the whole microstructure be 30% or more in order to achieve desired elongation. In the case where the total area ratio of a ferrite phase and a bainite phase is less than 30%, since there is an excessive increase in strength due to an increase in the area ratio of a hard martensite phase, it is possible to achieve mostly low elongation. It is preferable that the total area ratio of a ferrite phase and a bainite phase with respect to the whole microstructure be 45% or more. On the other hand, in the case where the total area ratio of a ferrite phase and a bainite phase is more than 70%, it is difficult to achieve a tensile strength of 900 MPa or more, and in addition, it is difficult to form a specific amount of a retained austenite phase, which contributes to an increase in elongation. Therefore, the total area ratio of a ferrite phase and a bainite phase is desirably 70% or less, preferably the total area ratio of a ferrite phase and a bainite phase is set to be 68% or less, or more preferably 65% or less. Accordingly, the total area ratio of a ferrite phase and a bainite phase is desirably set to be 30% or more and 70% or less, preferably 30% or more and 68% or less, or more preferably 45% or more and 65% or less.

Area ratio of a tempered martensite phase with respect to the whole microstructure: 20% or more and 40% or less A tempered martensite phase contributes to an increase in strength, and has less negative effect on elongation than a hard martensite phase before being subjected to a tempering treatment. A tempered martensite phase is effective for achieving a high TS-El balance, specifically, for satisfying the relationship TS×El≥26000 MPa·% by maintaining excellent elongation while contributing to an increase in strength. In order to realize such an effect, it is desirable that the area ratio of a tempered martensite phase with respect to the whole microstructure be 20% or more, or preferably 25% or more. However, in the case where the area ratio of a tempered martensite phase is more than 40%, since it is difficult to form a desired amount of a retained austenite phase, which contributes to an increase in elongation, it is difficult to satisfy the relationship TS×El≥26000 MPa·%. Therefore, the area ratio of a tempered martensite phase is desirably set to be 40% or less, preferably 35% or less. Accordingly, the area ratio of a tempered martensite phase is set to be 20% or more and 40% or less, more preferably 25% or more and 35% or less.

Area ratio of a retained austenite phase with respect to the whole microstructure: 10% or more and 20% or less A retained austenite phase is effective for increasing uniform elongation by preventing strain concentration as a result of undergoing transformation induced plasticity, in which a retained austenite phase undergoes transformation into a martensite phase in a portion to which strain is applied when a material is deformed to achieve an increase in hardness in the portion. In order to achieve desired excellent elongation (total elongation) by achieving high uniform elongation, it is desirable that the microstructure include 10% or more of a retained austenite phase. Therefore, the area ratio of a retained austenite phase with respect to the whole microstructure is desirably set to be 10% or more. However, a retained austenite phase is hard due to its high C concentration. In the case where a retained austenite phase is included excessively in a steel sheet in an amount of more than 20%, since hard portions are locally present, local elongation is suppressed, which makes it difficult to achieve excellent elongation (total elongation) and bendability. Therefore, the area ratio of a retained austenite phase with respect to the whole microstructure is desirably set to be 20% or less. Preferably, the area ratio of a retained austenite phase with respect to the whole microstructure is set to be 15% or less. Therefore, the area ratio of a retained austenite phase is desirably set to be 10% or more and 20% or less, or preferably 10% or more and 15% or less.

Area ratio of a martensite phase with respect to the whole microstructure: 2% or more and 20% or less A martensite phase, which is hard due to its high dislocation density, is clearly discriminated from a tempered martensite phase, which is soft due to its low dislocation density. That is, in the present invention, the meaning of "martensite phase" does not include a tempered martensite phase. A hard martensite phase contributes largely to an increase in tensile strength, and, in order to achieve a TS of 900 MPa or more, it is desirable that the area ratio of a martensite phase be 2% or more, or preferably 5% or more. However, since there is an excessive increase in strength and there is a decrease in elongation in the case where the area ratio of a martensite phase is excessively large, it is desirable that the area ratio of a martensite phase be 20% or less. Preferably, the area ratio of a martensite phase be 18% or less, or more preferably, the area ratio of a martensite phase be 15% or less. It is possible to achieve excellent elongation, by controlling the area ratio of a martensite phase to be 2% or more and 20% or less. Preferably, the area ratio of a martensite phase be 2% or more and 15% or less, or more preferably 5% or more and 15% or less.

In addition, the steel sheet according to aspects of the present invention is a high-strength galvanized steel sheet and has a galvanized coating layer on the surface of a high-strength steel sheet having the chemical composition and the microstructure described above. Here, the galvanized steel sheet according to one embodiment of the present invention is a non-alloyed galvanized steel sheet (GI) which is manufactured by dipping a steel sheet in a zinc bath as described below. Although there is no particular limitation on the coating weight of the galvanized coating, it is preferable that the coating layer having a coating weight of 30 g/m² to 120 g/m² per side be formed on one side or on both sides.

Hereafter, a method for manufacturing the high-strength galvanized steel sheet according to embodiments of the present invention will be described. The high-strength galvanized steel sheet which is an aim of aspects of the present invention is manufactured, e.g., by hot-rolling a steel slab having the chemical composition described above, by pickling the hot-rolled steel sheet, thereafter by performing cold rolling, thereafter by performing a heat treatment including heating the cold-rolled steel sheet to a temperature of 800° C. or higher and 950° C. or lower, and then cooling the heated steel sheet, thereafter by performing a heating treatment including heating the treated steel sheet to a temperature of 700° C. or higher and 850° C. or lower, cooling the heated steel sheet to a temperature of 100° C. or higher and 300° C. or lower at a cooling rate of 5° C./sec or more and 50° C./sec or less, stopping the cooling, and subsequently heating the cooled steel sheet to a temperature of 350° C. or higher and 600° C. or lower and holding the steel sheet for 10 seconds or more and 500 seconds or less, and thereafter by performing a galvanizing treatment. In the method according to one embodiment of the present invention, it is preferable that, after the pickling has been performed as described above, a heat treatment be performed in such a manner that the pickled steel sheet is heated to a temperature of 400° C. or higher and 750° C. or lower before the cold rolling is performed. In addition, temper rolling may be performed on the obtained galvanized steel sheet.

The preferred, limited ranges of the manufacturing conditions and the reasons for the limitations will be described in detail hereafter.

There is no particular limitation on what method is used for manufacturing a steel slab in the present invention, and a steel slab may be manufactured even using a thin-slab casting method or an ingot casting method. In particular, it is preferable that a continuous casting method be used in order to decrease the amount of segregation.

Also, there is no particular limitation on what method is used for hot rolling, and hot rolling may be performed using an ordinary method. Here, it is preferable that a heating temperature for hot rolling be 1100° C. or higher, and it is preferable that the upper limit of the heating temperature be about 1300° C. in order to decrease the amount of scale formed and to decrease fuel consumption rate. In addition, it is preferable that the finishing temperature of hot rolling (finishing delivery temperature) be 850° C. or higher in order to prevent the formation of a layered microstructure composed of ferrite and pearlite. In addition, it is preferable that the upper limit of the finishing temperature of hot rolling be about 950° C. in order to decrease the amount of scale formed and to obtain a fine and uniform microstructure by suppressing an increase in crystal grain diameter. It is preferable that a coiling temperature after hot rolling has been performed be 400° C. or higher, and also it is preferable that the coiling temperature be 600° C. or lower from the viewpoint of cold rolling performance and surface quality, respectively. Therefore, it is preferable that the coiling temperature be 400° C. or higher and 600° C. or lower.

The coiled steel sheet is subjected to pickling using an ordinary method, and then, cold-rolled into a desired thickness. There is no particular limitation on pickling conditions, and pickling may be performed using a conventionally well-known method such as one using hydrochloric acid. Also, there is no particular limitation on cold rolling conditions, and cold rolling may be performed using a conventionally well-known method in order to obtain a desired thickness. Here, although there is no particular limitation on the rolling reduction of cold rolling, it is preferable that the rolling reduction of cold rolling be 30% or more, and also it is preferable that the rolling reduction be 60% or less. Therefore, it is preferable that the rolling reduction of cold rolling be about 30% or more and 60% or less.

The cold-rolled steel sheet is subjected to a heat treatment including, e.g., heating the steel sheet to a temperature of 800° C. or higher and 950° C. or lower and then cooling the heated steel sheet, and then subjected to a heat treatment including heating the treated steel sheet to a temperature of 700° C. or higher and 850° C. or lower, cooling the heated steel sheet to a temperature of 100° C. or higher and 300° C. or lower at a cooling rate of 5° C./s or more and 50° C./s or less, stopping the cooling, and subsequently heating the steel sheet to a temperature of 350° C. or higher and 600° C. or lower and holding the steel sheet for 10 seconds or more and 500 seconds or less, and then subjected to a galvanizing treatment.

Heating cold-rolled steel sheet to a temperature of 800° C. or higher and 950° C. or lower and then cooling the heated steel sheet The steel sheet which has been subjected to cold rolling (cold-rolled steel sheet) is subjected to a heat treatment (annealing). In the case where the heat treatment temperature is lower than 800° C., since the area ratio of an austenite phase is small during the heat treatment, the distribution of C and Mn into austenite progresses, which results in austenite having high C concentration and high Mn concentration being finely dispersed. As a result, since a portion having high C concentration is fundamentally more readily to transform into a martensite phase than other portions, after the final heat treatment described below has been performed, there is an increase in the area ratio of a martensite phase, and non-uniform microstructure in which a martensite phase is present in the form of bands is formed again due to the non-uniform distribution of chemical elements such as C and Mn. Therefore, since there is a decrease in elongation, the relationship TS×El≥26000 MPa·% is not satisfied. Accordingly, the temperature with which the heat treatment (annealing) is performed on the steel sheet after cold rolling has been performed is set to be 800° C. or higher, or preferably 840° C. or higher. On the other hand, in the case where the heat treatment temperature is higher than 950° C., that is, within a range for forming an austenite single phase, since there is an excessive increase in the grain diameter of austenite, there is also an excessive increase in the diameter of crystal grains which are finally obtained, which results in a decrease in the amount of grain boundaries which are the nucleation sites of a ferrite phase. As a result, when the final heat treatment is performed after that, since the formation of a ferrite phase is suppressed, there is an increase in the area ratios of a tempered martensite phase and a martensite phase, which results in a decrease in elongation. Therefore, the temperature with which the heat treatment (annealing) is performed on the steel sheet after cold rolling has been performed is set to be 950° C. or lower, or preferably 900° C. or lower. Accordingly, the heat treatment temperature (annealing temperature) is set to be 800° C. or higher and 950° C. or lower, or preferably 840° C. or higher and 900° C. or lower.

There is no particular limitation on what kind of cooling is performed after annealing has been performed, cooling may be appropriately performed to room temperature. Here, it is preferable that the cooling stop temperature of the cooling which is performed after annealing has been performed be 300° C. or higher, or more preferably 350° C. or higher, in order to achieve high TS-El balance by achieving satisfactory elongation as a result of promoting bainite transformation and forming a desirable retained austenite phase. In addition, it is preferable that the cooling stop temperature be 500° C. or lower, or more preferably 450° C. or lower. Therefore, it is preferable that the cooling stop temperature be 300° C. or higher and 500° C. or lower, or more preferably 350° C. or higher and 450° C. or lower. In addition, it is preferable that the steel sheet be held at the cooling stop temperature range for 100 seconds or more, or more preferably 200 seconds or more, in order to form the desired amount of a retained austenite phase by promoting an increase in C concentration in an austenite phase. In addition, it is preferable that the holding time at the cooling stop temperature range be 1000 seconds or less, or more preferably 600 seconds or less. Therefore, it is preferable that the holding time at the cooling stop temperature range be 100 seconds or more and 1000 seconds or less, or more preferably 200 seconds or more and 600 seconds or less.

The final heat treatment may be performed following the heat treatment (annealing) after cold rolling has been performed as described above. The final heat treatment may be a heat treatment including, e.g., heating the annealed steel sheet to a temperature of 700° C. or higher and 850° C. or lower, cooling the heated steel sheet to a temperature of 100° C. or higher and 300° C. or lower at a cooling rate of 5° C./sec or more and 50° C./sec or less, stopping the cooling, that is, the heat treatment includes cooling the heated steel sheet to a cooling stop temperature of 100° C. or higher and 300° C. or lower, subsequently heating the cooled steel sheet to a temperature of 350° C. or higher and 600° C. or lower and holding the steel sheet for 10 seconds or more and 500 seconds or less.

Heat treatment temperature of the final heat treatment: 700° C. or higher and 850° C. or lower In the case where the heat treatment temperature of the final heat treatment is lower than 700° C., since there is an excessive increase in the area ratio of a ferrite phase during the heat treatment, it is difficult to achieve a TS of 900 MPa or more. Therefore, the heat treatment temperature of the final heat treatment is desirably set to be 700° C. or higher, or preferably 750° C. or higher. On the other hand, in the case where the heat treatment temperature of the final heat treatment is higher than 850° C., since there is an increase in the area ratio of an austenite phase during the heat treatment, there is a decrease in the area ratio of a ferrite phase in the steel sheet after a galvanizing treatment has been performed while there is an increase in the area ratios of phases other than a ferrite phase, and thus it is difficult to achieve satisfactory elongation. Therefore, the heat treatment temperature of the final heat treatment is desirably set to be 850° C. or lower, or preferably 830° C. or lower. Accordingly, the heat treatment temperature of the final heat treatment is desirably set to be 700° C. or higher and 850° C. or lower, or preferably 750° C. or higher and 830° C. or lower.

Cooling rate: 5° C./sec or more and 50° C./sec or less

The cooling rate for the cooling from the temperature of the final heat treatment is useful for obtaining the desired area ratios of the desired phases. Here, in the present invention, "cooling rate" refers to an average cooling rate from the heat treatment temperature of the final heat treatment to the cooling stop temperature. In the case where the cooling rate is less than 5° C./s, since there is an excessive softening due to an excessive increase in the amount of a ferrite phase formed, it is difficult to achieve a TS of 900

MPa or more. Therefore, the cooling rate is desirably set to be 5° C./s or more, or preferably 10° C./s or more. On the other hand, in the case where the cooling rate is more than 50° C./s, since there is an excessive increase in hardness due to an increase in the area ratios of phases other than a ferrite phase, there is a decrease in elongation. Therefore, the cooling rate is desirably set to be 50° C./s or less, preferably 40° C./s or less, or more preferably 30° C./s or less. Therefore, the cooling rate is desirably set to be 5° C./s or more and 50° C./s or less, preferably 10° C./s or more and 40° C./s or less, or more preferably 10° C./s or more and 30° C./s or less. Here, although it is preferable that this cooling be performed using a gas cooling method, it is not necessary to put a particular limitation on what method is used for this cooling. Cooling means such as furnace cooling, mist cooling, roll cooling, or water cooling can also be employed including combination of aforementioned cooling means.

Cooling stop temperature: 100° C. or higher and 300° C. or lower

In the case where the cooling stop temperature is lower than 100° C., an excessive amount of a martensite phase is formed when the cooling is stopped. Then, since the martensite phase is tempered when the heating (reheating) to a temperature of 350° C. or higher and 600° C. or lower is performed after the cooling, the formation of a retained austenite phase is hindered due to an increase in the area ratio of a tempered martensite phase which is finally obtained, and it is difficult to achieve excellent elongation. Therefore, the cooling stop temperature is desirably set to be 100° C. or higher, or preferably 150° C. or higher. On the other hand, in the case where the cooling stop temperature is higher than 300° C., an undesirable amount of a martensite phase is formed when the cooling is stopped. Since the martensite phase is tempered when the heating (reheating) to a temperature of 350° C. or higher and 600° C. or lower is performed after the cooling, there is an excessive decrease in the area ratio of a tempered martensite phase which is finally obtained. Moreover, since there is an increase in the amount of austenite after the steel sheet has been held at a temperature of 350° C. or higher and 600° C. or lower, a hard martensite phase is excessively formed when cooling is performed to room temperature after the holding has been performed, which makes excellent elongation difficult to be achieved due to an excessive increase in strength. Therefore, the cooling stop temperature is desirably set to be 300° C. or lower. Preferably the cooling stop temperature is set to be 275° C. or lower, and more preferably the cooling stop temperature is set to be 250° C. or lower. Accordingly, in order to achieve a tensile strength TS of 900 MPa or more and excellent elongation by controlling the area ratios of a ferrite phase, a bainite phase, a martensite phase, and a retained austenite phase to be within the desired ranges, the cooling stop temperature is desirably set to be 100° C. or higher and 300° C. or lower, preferably 100° C. or higher and 275° C. or lower, or more preferably 150° C. or higher and 250° C. or lower.

Heating to and holding at a temperature of 350° C. or higher and 600° C. or lower for 10 seconds or more and 500 seconds or less After the cooling has been stopped as described above, heating (reheating) may be performed to a temperature of 350° C. or higher and 600° C. or lower. In the case where the heating temperature (also referred to as reheating temperature) is lower than 350° C. or in the case where the holding time is less than 10 seconds, since it is difficult to form sufficient amount of tempered martensite, an excessive amount of a hard martensite phase is finally derived in the steel sheet, which makes excellent elongation difficult to be achieved due to an increase in the strength of the steel sheet. Therefore, the reheating temperature is desirably set to be 350° C. or higher, or preferably 370° C. or higher, and the holding time is desirably set to be 10 seconds or more, or preferably 20 seconds or more. On the other hand, in the case where the reheating temperature is higher than 600° C. or in the case where the holding time is more than 500 seconds, since a pearlite phase is formed or bainite transformation excessively progresses, there is an increase in the amount of a bainite phase. Therefore, it is difficult to achieve satisfactory elongation due to a decrease in the area ratio of a retained austenite phase which is finally obtained, or it is difficult to achieve a tensile strength of 900 MPa or more due to the formation of a martensite phase being inhibited. Accordingly, the reheating temperature is desirably set to be 600° C. or lower, or preferably 500° C. or lower, and the holding time is desirably set to be 500 seconds or less, or preferably 180 seconds or less. Therefore, after the cooling has been stopped as described above, heating to a temperature of, desirably, 350° C. or higher and 600° C. or lower and holding for, desirably, 10 seconds or more and 500 seconds or less may be performed.

Galvanizing Treatment

After holding the steel sheet at the reheating temperature as described above, a galvanizing treatment may be performed. A galvanizing treatment may be performed using an ordinary method such as one in which a steel sheet is dipped in a zinc bath containing, by mass %, 0.05% to 0.25% of Al and having a temperature of 440° C. to 500° C. and in which coating weight is thereafter controlled using, for example, a gas wiping method. It is not necessary to put a particular limitation on what kind of cooling is performed after the galvanizing treatment has been performed, and cooling may be performed to room temperature using an ordinary method such as an air cooling method or a gas cooling method. In addition, although it is not necessary to put a particular limitation on what kind of apparatus is used for the galvanizing treatment, it is preferable that the final heat treatment described above and the galvanizing treatment thereafter be performed using a continuous galvanization apparatus having a continuous annealing furnace from the viewpoint of productivity. Here, the steel sheet which has been subjected to a galvanizing treatment may be subjected to temper rolling for the purpose of, for example, surface roughness adjustment and shape correction, or various kinds of painting treatments such as oiling and coating.

In addition, in one embodiment of the present invention, it is preferable that, after the pickling has been performed as described above, a heat treatment be performed in such a manner that the pickled steel sheet is heated to a temperature of 400° C. or higher and 750° C. or lower before the cold rolling is performed. The heat treatment which is performed after hot rolling and pickling have been performed and before cold rolling is performed is effective for controlling the area ratio of a martensite phase, which is formed excessively after the final heat treatment has been performed due to the non-uniform distribution of chemical elements such as C and Mn, to be within an appropriate range, by forming a uniform microstructure which includes a ferrite phase as a parent phase and in which cementite is finely dispersed as a result of eliminating the non-uniform distribution of chemical elements such as C and Mn due to a hot-rolled microstructure. In addition, the heat treatment is effective for achieving increased TS-El balance by eliminating a non-uniform microstructure in which a martensite phase is present in the form of bands. In order to realize such effects, it is desirable that the heat treatment temperature of the heat treatment which is performed after hot rolling and pickling have been performed be 400° C. or higher, or preferably 450° C. or higher. However, in the case where the heat treatment temperature is higher than 750° C., that is, the heat treatment is performed in a temperature range in which a dual phase composed of a ferrite phase and an austenite phase is formed, a non-uniform microstructure in which chemical elements such as C and Mn are non-uniformly distributed is formed again after the heat treatment has been performed. In this case, since a martensite phase is more readily to be formed in a portion having high concentrations of C and Mn, it is difficult to obtain the desired microstructure due to a large amount of martensite phase being formed after the final heat treatment has been performed, which makes the relationship TS×El≥26000 MPa·% difficult to be satisfied. Therefore, it is preferable that the heat treatment temperature be 750° C. or lower, more preferably 700° C. or lower, or further more preferably 650° C. or lower. Therefore, there is a desired optimum range in order to form a markedly uniform microstructure before cold rolling is performed, and the heat treatment temperature with which the heat treatment is performed after hot rolling and pickling have been performed is desirably set to be 400° C. or higher and 750° C. or lower, preferably 450° C. or higher and 700° C. or lower, or more preferably 450° C. or higher and 650° C. or lower.

EXAMPLE 1

Molten steels having the chemical compositions given in Table 1 were manufactured and made into slabs, and then hot rolling was performed under conditions that the heating temperature was 1150° C., that the finishing delivery temperature was 870° C., and that the coiling temperature was 440° C. Subsequently, pickling was performed using hydrochloric acid, then the hot-rolled steel sheets were subjected to a heat treatment (heat treatment before cold rolling) under the conditions given in Table 2, then cold rolling was performed with a rolling reduction of 40% to 50%, and then a heat treatment after cold rolling was performed in such a manner that heating and cooling were performed under the conditions given in Table 2. Subsequently, the final heat treatment was performed under the conditions given in Table 2, and then, the steel sheet was dipped in a zinc bath (having an Al concentration of 0.15 mass %) having a temperature of 460° C. in order to form a galvanized coating film having a coating weight of 40 to 60 g/m² per side on both sides, and that cooling was performed at a cooling rate of 10° C./s, thereby a high-strength galvanized steel sheet having a thickness of 1.0 mm was manufactured. Here, some of the high-strength galvanized steel sheets were not subjected to the heat treatment before cold rolling. The material properties of the obtained high-strength galvanized steel sheets were investigated by conducting the material property tests described below. The obtained results are given in Table 3.

TABLE 1

| Steel Type | Chemical Composition (mass %) | | | | | | | | Note |
|---|---|---|---|---|---|---|---|---|---|
| | C | Si | Mn | P | S | Al | N | Ca | |
| A | 0.200 | 1.60 | 1.80 | 0.006 | 0.0009 | 0.050 | 0.0040 | 0.0004 | Example |
| B | 0.190 | 1.40 | 2.20 | 0.005 | 0.0007 | 0.040 | 0.0050 | 0.0003 | Example |
| C | 0.220 | 1.45 | 1.90 | 0.004 | 0.0004 | 0.040 | 0.0030 | 0.0002 | Example |
| D | 0.210 | 1.50 | 2.10 | 0.006 | 0.0006 | 0.050 | 0.0050 | 0.0003 | Example |
| E | 0.180 | 1.55 | 2.30 | 0.008 | 0.0008 | 0.045 | 0.0040 | 0.0004 | Example |
| F | 0.170 | 1.10 | 3.20 | 0.005 | 0.0005 | 0.035 | 0.0045 | 0.0004 | Comparative Example |

TABLE 2

| No. | Steel Type | Heat Treatment before Cold Rolling Heat Treatment Temperature (° C.) | Heat Treatment after Cold Rolling | | Final Heat Treatment | | | | | Note |
|---|---|---|---|---|---|---|---|---|---|---|
| | | | Heat Treatment Temperature (° C.) | Cooling Stop Temperature (° C.) | Heat Treatment Temperature (° C.) | Cooling Rate (° C./s) | Cooling Stop Temperature (° C.) | Reheating Temperature (° C.) | Holding Time (sec) | |
| 1 | A | 650 | 900 | 350 | 750 | 25 | 250 | 460 | 40 | Example |
| 2 | B | Undone | 880 | 375 | 770 | 20 | 240 | 440 | 90 | Example |
| 3 | C | 500 | 840 | 425 | 790 | 15 | 220 | 420 | 60 | Example |
| 4 | D | Undone | 860 | 400 | 800 | 10 | 200 | 400 | 80 | Example |
| 5 | E | 600 | 860 | 375 | 810 | 15 | 200 | 380 | 140 | Example |
| 6 | F | 650 | 880 | 400 | 820 | 25 | 250 | 400 | 200 | Comparative Example |
| 7 | A | Undone | 770 | 400 | 760 | 10 | 175 | 450 | 75 | Comparative Example |
| 8 | A | Undone | 980 | 425 | 770 | 15 | 200 | 425 | 100 | Comparative Example |
| 9 | A | 500 | 860 | 450 | 680 | 20 | 225 | 400 | 80 | Comparative Example |
| 10 | A | 600 | 840 | 400 | 860 | 25 | 250 | 375 | 50 | Comparative Example |
| 11 | A | Undone | 840 | 350 | 830 | 2 | 225 | 390 | 75 | Comparative Example |
| 12 | A | Undone | 860 | 375 | 820 | 100 | 200 | 410 | 100 | Comparative Example |
| 13 | A | 500 | 900 | 400 | 800 | 20 | 50 | 430 | 80 | Comparative Example |
| 14 | A | 450 | 880 | 425 | 810 | 25 | 375 | 450 | 160 | Comparative Example |
| 15 | A | Undone | 860 | 400 | 790 | 15 | 225 | 250 | 240 | Comparative Example |
| 16 | A | Undone | 840 | 375 | 810 | 10 | 250 | 650 | 200 | Comparative Example |
| 17 | A | 550 | 860 | 400 | 790 | 15 | 200 | 400 | 2 | Comparative Example |
| 18 | A | 650 | 840 | 375 | 810 | 10 | 250 | 380 | 800 | Comparative Example |

Microstructure of Steel Sheet

The area ratios of the constituent phases with respect to the whole microstructure were determined by observing the cross section in the rolling direction which was located at ¼ of the thickness using an optical microscope. By using a microstructure photograph in the cross section obtained at a magnification of 1000 times, and by using image analysis, occupation areas were determined in a square region of 100 μm×100 μm which was arbitrarily selected. Here, the observation was conducted for 5 samples (five observation fields of view). In addition, when the microstructure observation was conducted, etching was performed using a liquid mixture of 3 vol. % picral and 3 vol. % sodium metabisulfite. The total area ratio of a ferrite phase and a bainite phase was determined under the assumption that regions appearing black in the observation of the microstructure corresponded to a ferrite phase (polygonal ferrite phase) or a bainite phase. In addition, the total area ratio of a tempered martensite phase, a martensite phase, and a retained austenite phase was determined under the assumption that regions other than the regions appearing black corresponded to a tempered martensite phase, a martensite phase, or a retained austenite phase, and the microstructure of the steel sheet was divided into two kinds of regions.

In addition, as described below, the amount of retained austenite was determined using an X-ray diffraction method, and the determined amount of retained austenite was converted into the area ratio of a retained austenite phase. Here, the amount of retained austenite was determined using an X-ray diffraction method using the Kα-ray of Mo. That is, by using a test piece having a measuring surface which was located at about ¼ of the thickness of the steel sheet, and by calculating the amount (volume ratio) of a retained austenite phase on the basis of the peak intensities of the (211) and (220) planes of an austenite phase and the peak intensities of the (200) and (220) planes of a ferrite phase, the amount was converted into the area ratio of a retained austenite phase. A tempered martensite phase was discriminated from a martensite phase by using a microstructure photograph of a cross section in the rolling direction obtained at a magnification of 1000 to 3000 times using a scanning electron microscope (SEM) and by using image analysis, by determining occupation areas in a square region of 50 μm×50 μm which was arbitrarily selected, and by conducting the observation for 5 samples. The observation was conducted for 5 samples (five observation fields of view). In addition, when the microstructure observation was conducted, etching was performed using nital, and, under the assumption that a block-like region having a smooth surface which was observed in a SEM photograph corresponded to a martensite phase and that a block-like region having a surface on which, for example, carbides were observed corresponded to a tempered martensite phase, the area ratios were determined.

In addition, the area ratio of a pearlite phase was determined by using a microstructure photograph in a cross section in the rolling direction obtained at a magnification of 1000 times using an optical microscope, by using image analysis, by determining an occupation area in a square region of 100 μm×100 μm which was arbitrarily selected. The observation was conducted for 5 samples (five observation fields of view). In addition, when the microstructure observation was conducted, etching was performed using nital, and the area ratio of a pearlite phase was determined under the assumption that black regions in a photograph obtained by using an optical microscope correspond to a pearlite phase.

Tensile Properties (Tensile Strength and Elongation)

By using a JIS No. 5 test piece in accordance with JIS Z 2201 whose longitudinal direction (tensile direction) was at a right angle to the rolling direction, and by conducting a tensile test in accordance with JIS Z 2241, yield strength (YP), tensile strength (TS), and total elongation (El) were investigated. The results are given in Table 3. Here, elongation was evaluated in terms of TS-El balance, and a case where the relationship TS×El≥26000 MPa·% was satisfied was judged as satisfactory elongation.

Stretch Flange Formability

In accordance with The Japan Iron and Steel Federation Standard JFS T 1001, a hole-expansion ratio was determined. That is, by punching a hole having an initial diameter $d_0$ of 10 mm, by pushing up a conical punch having a point angle of 60° in order to expand the hole, by stopping the pushing up of the conical punch when a crack penetrated through the thickness direction, and by determining the diameter d of the punched hole after the crack penetrated through the thickness, a hole-expansion ratio was calculated by the equation hole-expansion ratio $(\%)=((d-d_0)/d_0)\times 100$. By conducting the test 3 times for each number of steel sheet, the average value (λ) of the hole-expansion ratios was calculated. Here, stretch flange formability was evaluated in terms of TS-λ balance, and a case where the relationship TS×λ≥30000 MPa·% was satisfied was judged as satisfactory stretch flange formability.

TABLE 3

| No. | Steel Type | Microstructure* | | | | | Material Property | | | | | | Note |
|---|---|---|---|---|---|---|---|---|---|---|---|---|---|
| | | α + B (%) | TM (%) | γ (%) | M (%) | P (%) | YP (MPa) | TS (MPa) | El (%) | γ (%) | TS × El (MPa · %) | TS × λ (MPa · %) | |
| 1 | A | 45 | 33 | 13 | 9 | 0 | 720 | 1080 | 25.5 | 30 | 27540 | 32400 | Example |
| 2 | B | 48 | 32 | 13 | 7 | 0 | 700 | 1060 | 24.8 | 31 | 26288 | 32860 | Example |
| 3 | C | 49 | 23 | 14 | 14 | 0 | 680 | 1050 | 26.0 | 33 | 27300 | 34650 | Example |
| 4 | D | 49 | 32 | 14 | 5 | 0 | 660 | 1040 | 25.1 | 35 | 26104 | 36400 | Example |
| 5 | E | 53 | 28 | 15 | 4 | 0 | 650 | 940 | 31.0 | 32 | 29140 | 30080 | Example |
| 6 | F | 22 | 35 | 10 | 33 | 0 | 830 | 1150 | 15.0 | 22 | 17250 | 25300 | Comparative Example |
| 7 | B | 22 | 35 | 10 | 33 | 0 | 780 | 1080 | 16.0 | 25 | 17280 | 27000 | Comparative Example |
| 8 | B | 20 | 30 | 11 | 39 | 0 | 900 | 1120 | 14.0 | 22 | 15680 | 24640 | Comparative Example |
| 9 | C | 73 | 10 | 10 | 7 | 0 | 450 | 720 | 30.0 | 44 | 21600 | 31680 | Comparative Example |
| 10 | C | 25 | 30 | 10 | 35 | 0 | 800 | 1150 | 14.0 | 20 | 16100 | 23000 | Comparative Example |
| 11 | D | 75 | 8 | 10 | 7 | 0 | 450 | 700 | 31.0 | 46 | 21700 | 32200 | Comparative Example |
| 12 | D | 28 | 28 | 10 | 34 | 0 | 800 | 1090 | 15.0 | 25 | 16350 | 27250 | Comparative Example |
| 13 | E | 25 | 65 | 5 | 5 | 0 | 880 | 1120 | 13.0 | 28 | 14560 | 31360 | Comparative Example |
| 14 | E | 34 | 12 | 10 | 44 | 0 | 930 | 1250 | 14.0 | 18 | 17500 | 22500 | Comparative Example |
| 15 | D | 43 | 5 | 2 | 50 | 0 | 1120 | 1310 | 8.0 | 15 | 10480 | 19650 | Comparative Example |

TABLE 3-continued

| | | Microstructure* | | | | | Material Property | | | | | | |
|---|---|---|---|---|---|---|---|---|---|---|---|---|---|
| Steel No. | Steel Type | α + B (%) | TM (%) | γ (%) | M (%) | P (%) | YP (MPa) | TS (MPa) | El (%) | γ (%) | TS × El (MPa · %) | TS × λ (MPa · %) | Note |
| 16 | D | 40 | 34 | 4 | 12 | 10 | 670 | 1050 | 21.0 | 34 | 22050 | 35700 | Comparative Example |
| 17 | C | 42 | 15 | 8 | 35 | 0 | 780 | 1210 | 10.0 | 22 | 12100 | 26620 | Comparative Example |
| 18 | C | 68 | 29 | 2 | 1 | 0 | 710 | 800 | 18.0 | 35 | 14400 | 28000 | Comparative Example |

*α ferrite phase,
B: bainite phase,
TM: tempered martensite phase,
γ: retained austenite phase,
M: martensite phase,
P: pearlite phase As Table 3 indicates, in the case of the preferred examples of the present invention, high-strength galvanized steel sheets having a tensile strength of 900 MPa or more which are excellent in terms of elongation so that the relationship TS×El≥26000 MPa·% is satisfied and which are excellent in terms of stretch flange formability so that the relationship TS×λ≥30000 MPa·% is satisfied are obtained.

On the other hand, in the case of No. 6 whose chemical composition is out of the preferred range according to aspects of the present invention because of excessive Mn content, since the area ratio of a martensite phase is large, the elongation is small. In the case of No. 7 where the heat treatment temperature after cold rolling has been performed is low, and in the case of No. 8 where the heat treatment temperature after cold rolling has been performed is high, since the area ratio of a martensite phase is large, the elongation is small. In the case of No. 9 where the heat treatment temperature for the final heat treatment is low, and in the case of No. 11 where the cooling rate for the final heat treatment is low, since the total area ratio of a ferrite phase (polygonal ferrite phase) and a bainite phase is large, and since the area ratio of a tempered martensite phase with respect to the whole microstructure is small, the TS is less than 900 MPa. In the case of No. 10 where the heat treatment temperature for the final heat treatment is high, in the case of No. 12 where the cooling rate for the final heat treatment is high, in the case of No. 14 where the cooling stop temperature for the final heat treatment is high, in the case of No. 15 where the reheating temperature is low, and in the case of No. 17 where the holding time at reheating is short, since the area ratio of a martensite phase with respect to the whole microstructure is large, the elongation is small. In the case of No. 13 where the cooling stop temperature after the final heat treatment is low and in the case of No. 18 where the holding time at the reheating is long, since the area ratio of a retained austenite phase is small, the elongation is small. In the case of No. 16 where the reheating temperature is high, since the area ratio of a retained austenite phase is small due to the formation of pearlite, the elongation is small.

According to aspects of the present invention, it is possible to obtain a high-strength galvanized steel sheet having a tensile strength (TS) of 900 MPa or more which is inexpensive and which is excellent in terms of elongation, even if expensive chemical elements such as Nb, V, Cu, Ni, Cr, and Mo are not actively added. In addition, the high-strength galvanized steel sheet according to aspects of the present invention can suitably be used not only for automobile parts but also for, for example, the applications for building and domestic electrical appliances in which dimension accuracy and formability are strongly required.

The invention claimed is:

1. A high-strength galvanized steel sheet having a chemical composition containing, by mass %,
C: 0.16% or more and 0.24% or less,
Si: 0.8% or more and 1.8% or less,
Mn: 1.0% or more and 3.0% or less,
P: 0.020% or less,
S: 0.0040% or less,
Al: 0.01% or more and 0.1% or less,
N: 0.01% or less,
Ca: 0.0001% or more and 0.0020% or less,
to which Ti, Nb, V, Cu, Ni, Cr, and Mo are not actively added,
the balance comprising Fe and incidental impurities, and
a microstructure, in which the total area ratio of a ferrite phase and a bainite phase with respect to the whole microstructure is 30% or more and 70% or less, in which the area ratio of a tempered martensite phase with respect to the whole microstructure is 20% or more and 40% or less, in which the area ratio of a retained austenite phase with respect to the whole microstructure is 10% or more and 20% or less, and in which the area ratio of a martensite phase with respect to the whole microstructure is 2% or more and 20% or less, wherein the high-strength galvanized steel sheet has a TS×El≥26000 MPa·%.

2. A method for manufacturing a high-strength galvanized steel sheet, the method comprising hot-rolling a steel slab having the chemical composition according to claim 1, performing pickling on the hot-rolled steel sheet, thereafter performing cold rolling, thereafter performing a heat treatment including heating the cold-rolled steel sheet to a temperature of 800° C. or higher and 950° C. or lower, and then cooling the heated steel sheet, thereafter performing another heat treatment including heating the treated steel sheet to a temperature of 700° C. or higher and 850° C. or lower, cooling the heated steel sheet to a temperature of 100° C. or higher and 300° C. or lower at a cooling rate of 5° C./sec or more and 50° C./sec or less, stopping the cooling, and subsequently heating the cooled steel sheet to a temperature of 350° C. or higher and 600° C. or lower and holding the steel sheet for 10 seconds or more and 500 seconds or less, and thereafter performing a galvanizing treatment.

3. The method for manufacturing a high-strength galvanized steel sheet according to claim 2, the method further comprising performing a heat treatment on the pickled steel sheet in such a manner that the pickled steel sheet is heated to a temperature of 400° C. or higher and 750° C. or lower before the cold rolling is performed.

* * * * *